United States Patent [19]
Lee et al.

[11] Patent Number: 5,367,241
[45] Date of Patent: Nov. 22, 1994

[54] ROTATION SPEED DETECTING APPARATUS FOR A MOTOR HAVING AN ENCODER

[75] Inventors: Jin W. Lee; Dong I. Kim, both of Seoul, Rep. of Korea

[73] Assignee: SamSung Electronics Co., Ltd., Suwon, Rep. of Korea

[21] Appl. No.: 86,826

[22] Filed: Jul. 7, 1993

[30] Foreign Application Priority Data

Jul. 9, 1992 [KR] Rep. of Korea .................... 92-12188

[51] Int. Cl.$^5$ ............................................. H02P 5/40
[52] U.S. Cl. .................................. 318/799; 318/798; 318/803; 318/685
[58] Field of Search .................. 318/710–816, 318/685–700, 603, 618, 560–689, 254, 138, 139

[56] References Cited

U.S. PATENT DOCUMENTS

| | | | |
|---|---|---|---|
| 3,924,721 | 12/1975 | Reynolds | 318/685 X |
| 3,970,931 | 7/1976 | Novak | 318/685 X |
| 4,259,621 | 3/1981 | Jakobsen et al. | 318/85 |
| 4,355,305 | 10/1982 | Cording et al. | 318/565 |
| 4,458,192 | 7/1984 | Sakamoto et al. | 318/798 |
| 4,499,414 | 2/1985 | Fujioka et al. | 318/803 |
| 4,558,269 | 12/1985 | Ishida et al. | 318/811 |
| 4,575,667 | 3/1986 | Kurakake | 318/803 |
| 4,578,746 | 3/1986 | Gyugyi et al. | 318/810 X |
| 4,581,696 | 4/1986 | Gyugyi et al. | 318/810 X |
| 4,588,937 | 5/1986 | Fujioka et al. | 318/677 |
| 4,623,831 | 11/1986 | Sakamoto et al. | 318/799 |
| 4,626,762 | 12/1986 | Fujioka et al. | 318/809 |
| 4,680,525 | 7/1987 | Kobari et al. | 318/798 |

FOREIGN PATENT DOCUMENTS 63-123267  5/1988  Japan .

Primary Examiner—Paul Ip
Attorney, Agent, or Firm—Burns, Doane, Swecker & Mathis

[57] ABSTRACT

A rotation speed detecting apparatus for a motor includes a motor; an encoder section, attached to the motor, for producing at least two encoder pulse signals each 90 degrees out of phase from the other; a control and division number setting section for controlling the rotation direction and speed of the motor according to the loaded program, setting a division number and producing a division control signal according to the set division number; a quadrupled pulse signal producing section for producing an up/down pulse signal according to the forward and reverse rotation directions of the motor on a quadrupled pulse signal and an up/down pulse signal produced according to the state transitions in the encoder pulse signals; and, a frequency dividing section for counting up or down the quadrupled pulse signal and dividing the quadrupled pulse signal by the set division number.

18 Claims, 3 Drawing Sheets

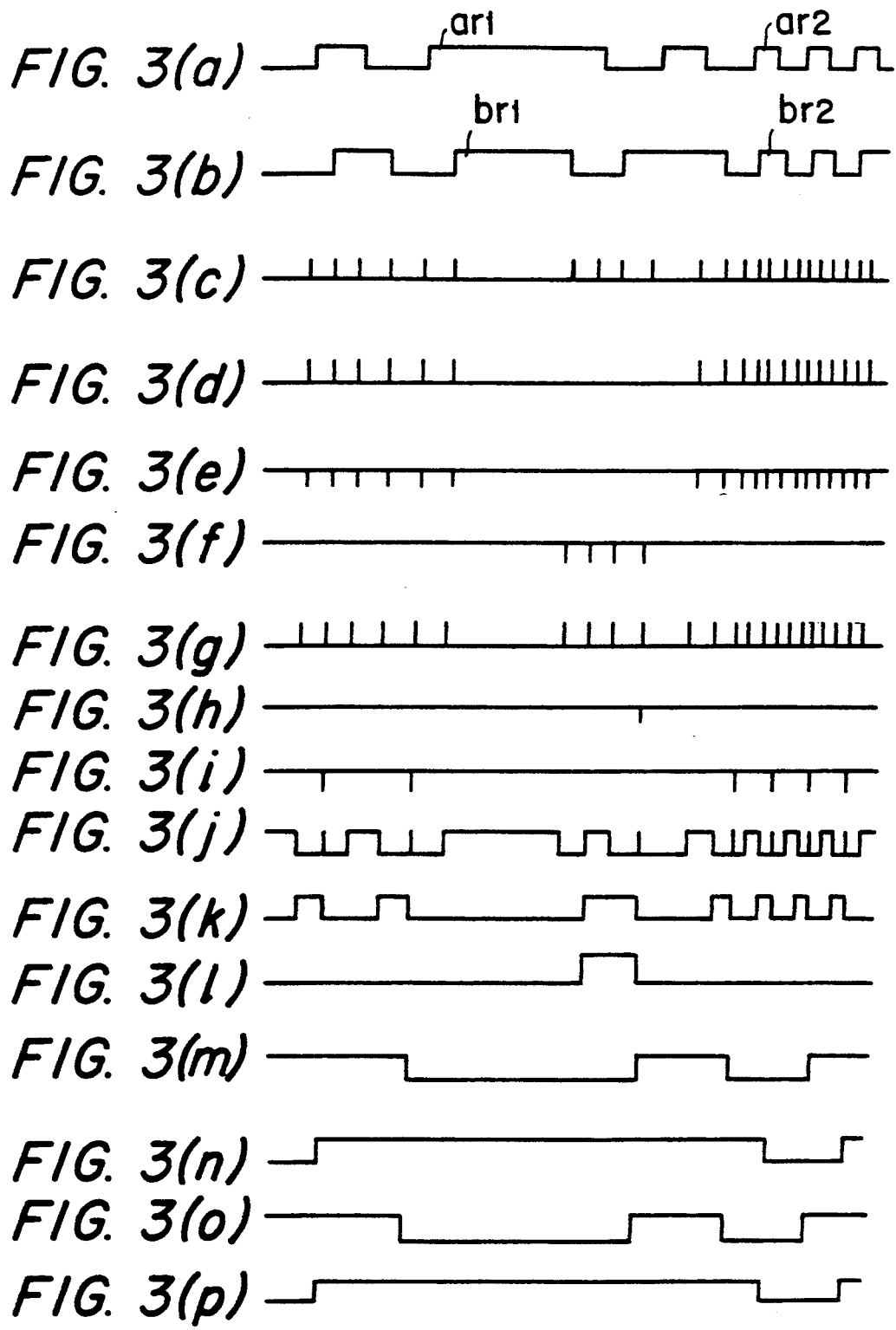

ROTATION SPEED DETECTING APPARATUS FOR A MOTOR HAVING AN ENCODER

BACKGROUND OF THE INVENTION

1. Field of the Invention

The present invention is related to a rotation speed detecting apparatus for a motor having an encoder, and particularly to a rotation speed detecting apparatus for a motor, which properly divides the frequency of the pulse signal generated from the encoder, thereby exactly detecting the rotation speed of the motor.

2. Description of the Prior Art

Most servo systems perform the desired control after detecting the rotation speed of the motor by an encoder attached to the motor.

In the conventional rotation speed detecting system for a motor, the system uses either a F/V convertor (frequency to voltage convertor) or the number of encoder pulses per a predetermined sampling time. However, the conventional rotation speed detecting systems have a problem in that when the motor rotates at a low speed, the detection errors becomes high.

In order to solve this problem, a system has been recently developed which detects the duration of each encoder pulse signal with a clock pulse with a high frequency used in a microprocessor. That is, the system detects the rotation speed of the motor by counting the number of clock pulses which occur between each successive rising or falling edge of the encoder pulse signal.

Accordingly, the greater the difference between the duration of each encoder pulse and the period of the clock pulse, the less the detection error will be.

However, when the motor is rotated at high speed, the difference between the duration of each encoder pulse and the period of the clock pulse becomes relatively small. Consequently, there is a problem in that the detection error in the rotation speed increases because the number of clock pulses which occur between each successive rising or falling edge of the encoder pulse signal is relatively reduced.

On the other hand, a typical servo control apparatus is disclosed in this Japanese Patent Laid-Open No. 123267 (1988). The apparatus disclosed in Japanese Patent Publication properly divides the frequency of a feedback pulse from a servo motor encoder by a frequency driving circuit, thereby providing enough time for the microprocessor to perform the required operation.

However, the invention disclosed in the Japanese Patent Publication has the limited purpose of executing the smooth scanner action to a wide variable power. Furthermore, the apparatus is limited in that the maximum division number N is small and it can only perform discontinuous division by the Nth power of 2, where N is a positive integer including zero.

SUMMARY OF THE INVENTION

It is an object of the present invention to provide a rotation speed detecting apparatus broadly applicable to a servo control system.

It is another object of the present invention to provide a rotation speed detecting apparatus for a motor for properly dividing the pulse signals produced from an encoder attached to the motor, thereby enabling it to detect the rotation speed of the motor extending over wide speed ranges.

It is still another object of the present invention to provide a rotation speed detecting apparatus for a motor for enabling it to increase or decrease by one the division number for the pulse signals produced from an encoder attached to the motor.

The rotation speed detecting apparatus for a motor according to the present invention includes a motor; encoder means attached to the motor, for producing at least two encoder pulse signals, each of which is 90 degrees out of phase with the other; means for controlling the rotation direction and speed of the motor according to the loaded program, setting a division number and producing a division control signal according to the set division number; means for producing an up/down pulse signal according to the forward and reverse rotation directions of the motor and a quadruple pulse signal and an up/down pulse signal produced according to the state transitions in the encoder pulse signals; and, means for counting up or down the quadrupled pulse signal and dividing the quadrupled pulse signal by the set division number.

The rotation speed detecting apparatus may further include means for removing unwanted noise pulses (hereinafter, called glitches) from the output of the dividing means, which may be attendant upon the divided encoder pulse signals.

BRIEF DESCRIPTION OF THE DRAWINGS

These and other aspects of the present invention are clarified by reference to the accompanying drawings in which.

DETAILED DESCRIPTION OF THE PREFERRED EMBODIMENT

Hereinafter, a rotation speed detecting apparatus according to the present invention will be described in detail in reference to the accompanying drawings.

Figure 1:
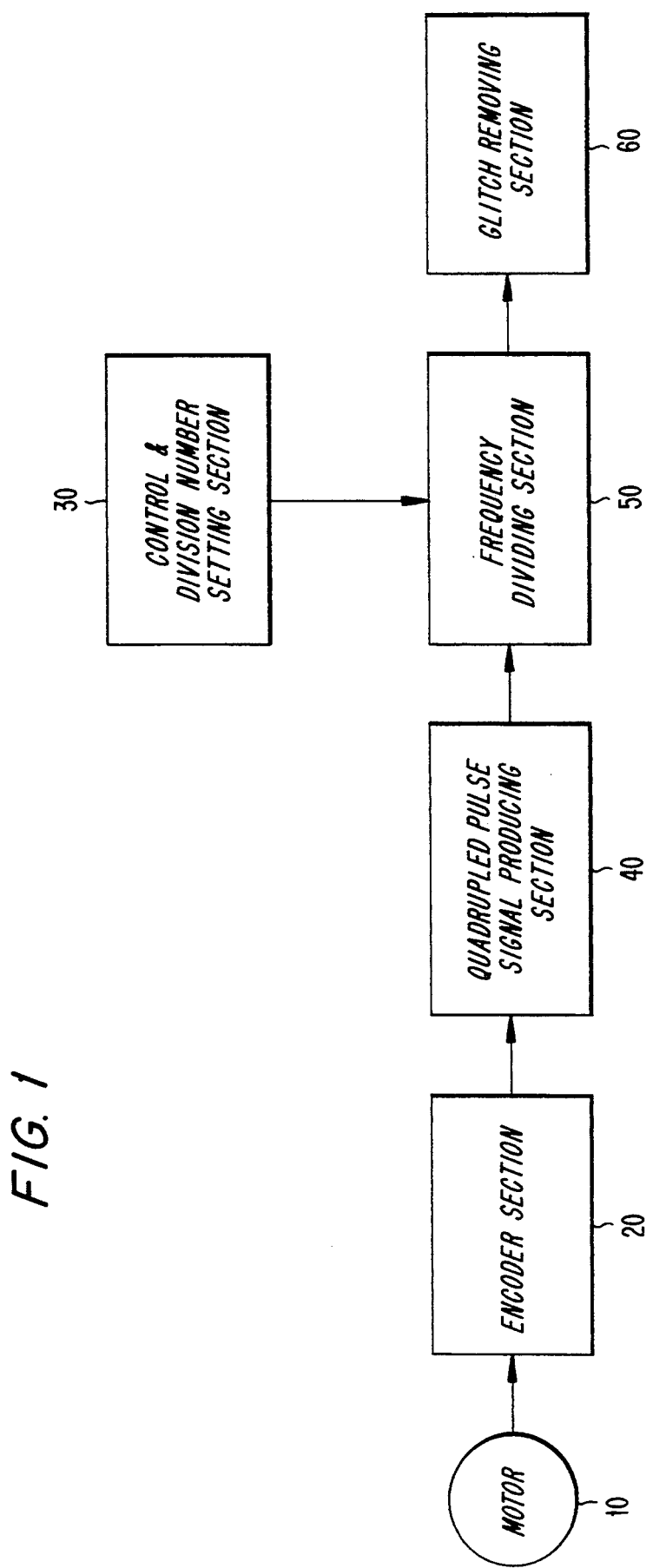
FIG. 1 is a schematic diagram of a rotation speed detecting apparatus according to the invention.
Figure 2:
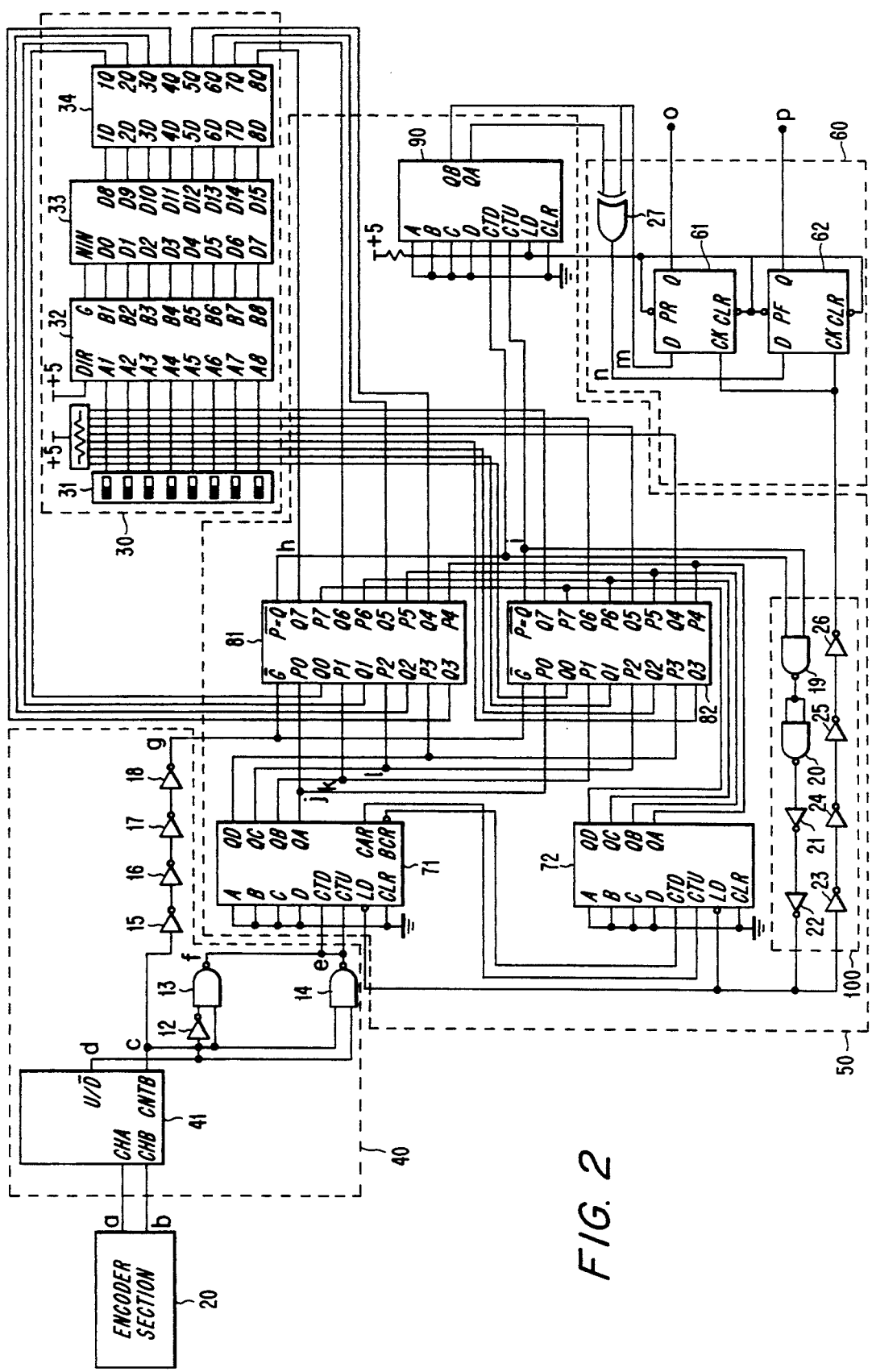
FIG. 2 is a detailed circuit diagram of a rotation speed detecting apparatus according to the present invention; and, FIGS. 3 (a) to (p) are waveform diagrams at major points of the circuit shown in FIG. 2.

Referring to FIGS. 1 to=3, an encoder section 20 is attached to a motor 10, and produces two encoder pulse signals (a) and (b) each of which is 90 degrees out of phase with the other and which are subsequently used to produce a quadrupled pulse signal.

A quadrupled pulse signal generating section 40 includes a decoder/counter 41 for producing a quadrupled pulse signal (c) according to the state transitions in the encoder pulse signals (a) and (b) and producing either a counting up or down pulse signal (d) (hereinafter, called an up/down pulse signal) having different logic levels from each other according to the rotation direction of the motor 10. The quadrupled pulse signal generating section further includes Schmitt-trigger invertors 15 to 18 for delaying the quadrupled pulse signal (c) for a given time, an invertor 12 for inverting the up/down pulse signal (d), a NAND gate 13 for the pulse signal inverted from the invertor 12 and the quadrupled pulse signal (c), and a NAND gate 14 for the quadrupled pulse signal (c) and the up/down pulse signal (d).

In the signal producing section 40, the decoder/counter 41 may be embodied by an IC, for example the HCTL2020 chip which is manufactured by Hewlett Packard Co. The decoder/counter 41 may be also embodied by a general transistor-transistor logic circuit.

A control and division number setting section 30 includes a microprocessor 33 for controlling the rotation direction and speed of the motor 10 and producing a division control signal corresponding to an appropriate division number after comparing the number of clock pulses which occur between each successive rising or falling edge of the encoder pulse signals with the reference number of clock pulses. The control and division number setting section 30 further includes a switch board 31 for externally setting a division number N, where the maximum value is 128, a transceiver 32 for receiving or transmitting the set division number to the microprocessor 33 and a latch 34 for temporarily storing the division control signal from the microprocessor 33.

In the control and setting section 30, the microprocessor 33 may be preferably embodied in one chip, which can produce high frequency clock pulses, for example a frequency of 2MHz, with a counter for counting the number of clock pulses which occur between each successive rising or falling edge of the encoder pulse signals. As for the microprocessor 33, an IC which is manufactured by Nippon Electric Co. and is denoted as NEC78310, may be preferably used. On the other hand, it may be preferable that transceiver 32 and latch 34 are embodied by 74245 and 74373 ICs belonging to the TTL family.

A frequency dividing section 50 includes several counters 71, 72 and 90, several comparators 81 and 82 and a clock generator 100. The two 4-bit synchronous counters 71 and 72 connected to each other may count the quadrupled pulse signals (e) and (f) up to a maximum of $128_{10}(2^8)$. The comparator includes a first and second 8-bit comparators 81 and 82, respectively, which compares the quadrupled pulse signal with the division control signal output from the control and setting section 30. The input terminals P0 to P3 of the first and second comparators 81 and 82, respectively, are connected to the output terminals QA to QD of the counter 71, and the input terminals P4 to P7 of the first and second comparators 81 and 82, respectively, are connected to the output terminals QA to QD of the counter 72. On the other hand, other input terminals Q0 to Q7 of the first comparator 81 are connected to the output terminals Q1 to Q8 of the latch 34, and other input terminals Q0 to Q7 of the second comparator 82 are connected to the corresponding pins of the switch board 31. In the arrangement described above, the first comparator 81 can be used in the counting up operation and the second comparator 82 can be used in the counting down operation. The input terminals $\overline{G}$ of the first and second comparators 81 and 82 are connected to the output terminal of a Schmitt-trigger invertor 18, and the output terminals P=Q of the first and second comparators 81 and 82, respectively, are connected to the terminals CTD and CTU of the counter 90.

The clock generator 100 includes NAND gates 19 and 20 for 1/N division signals (h) and (i) from each output terminal P=Q of the comparators 81 and 82, Schmitt-trigger invertors 21 and 22 for delaying the output signal from the NAND gate 20 for a given time and other Schmitt-trigger invertors 23 to 26 for delaying the output signal from the Schmitt-trigger invertor 22 for a given time again. The junction of the Schmitt-trigger invertors 22 and 23 is connected to the terminals LD of the counters 71 and 72.

A glitch removing section 60 includes an exclusive OR gate 27 for the pulse output signals from terminals QA and QB of the counter 90, a D flip-flop 62 for delaying the output signal of the exclusive OR gate 27 for a given time and another D flip-flop 61 for delaying the pulse signal transmitted from the terminal QB of the counter 90. Each clock terminal CK of the D flip-flops 61 and 62 for determining the time delay is connected to the output terminal of the Schmitt-trigger invertor 26.

Hereinafter, the operation of the rotation speed detecting apparatus will be described in detail.

When the two encoder pulse signals (a) and (b) as shown in FIG. 3, which are 90 degrees out of phase with each other, are transmitted to the decoder/counter 41 through the channels CHA and CHB thereof, the decoder/counter 41 produces the quadrupled pulse signal (c) as shown in FIG. 3 through the terminal CNTB according to the quadrature state transitions.

When the motor 10 is rotated in the forward direction, the pulse signal (a) leads the pulse signal (b) by 90 degrees, whereas when the motor 10 is rotated in the reverse direction, the pulse signal (a) lags the pulse signal (b) by 90 degrees. That is, the rising edge br1 in the pulse signal (b) leads the rising edge ar1 in the pulse signal (a) by 90 degrees. On the other hand, the rising edge br2 in the pulse signal (b) lags the rising edge ar2 in the pulse signal (a) by 90 degrees, which indicates that the motor 10 is rotating in the forward direction.

The decoder/counter 41 also produces the quadrupled pulse signal (d) for either the forward or the reverse direction of the motor 10 through the terminal U/$\overline{D}$ thereof. The quadrupled pulse signal (c) is then transmitted to each input terminal of the NAND gates 13 and 14, and the pulse signal (d) is transmitted to the other input terminal of the NAND gate 13 via the invertor 12 and is then directly transmitted to the other input terminal of the NAND gate 14. Thus, the NAND gate 14 generates the inverted pulse signal (e) for the forward direction of the motor 10 through the output terminal thereof, whereas the NAND gate 13 generates the inverted pulse signal (f) for the reverse direction of the motor 10 through the output terminal thereof. The inverted pulse signals (e) and (f) are transmitted to the terminals CTU and CTD, respectively, of the counter 71 to be counted thereby. The quadrupled pulse signal (c) is also transmitted to each terminal $\overline{G}$ of the first and second comparators 81 and 82 to enable or disable the first and second comparators 81 and 82 after being delayed by the series-connected Schmitt-trigger invertors 15 to 18 for a given time. The output terminals CAR and BCR of the Counter 71 are connected to the input terminals CTU and CTD, respectively, of the counter 72, thereby enlarging the 4-bit counter to become an 8-bit counter.

FIGS. 3 (j) to (l) show the wave forms at some output terminals of the counter 71.

The 8-bit count value of the counters 71 and 72 are transmitted to the input terminals P0 to P7, respectively, of the first and second comparators 81 and 82.

By the way, a user may select a desired division number through the switch board 31 of the control and setting section 30. For example, the user may raise the division number N when the rotation speed of the motor 10 is increased, whereas the user may lower the division number N when the rotation speed is lowered.

The counting up operation will now be described. When the user selects $0000\ 0011_2$ as the division number N through the switch board 31, the signal from the switch board 31 is directly transmitted to the terminals Q0 to Q7 of the comparators 81 and 82. When the binary value from the terminals Q0 to Q7 of the comparator 82 is the same as the binary value output from the counters 71 and 72, the comparator 82 transmits a low level pulse to the terminal CTU of the counter 90 per 3 quadrupled pulses through the terminal P=Q thereof.

The counting down operation will now be described. When the user selects 0000 0011$_2$ as the division number N through the switch board 31, the signal from the switch board 31 is transmitted to the corresponding terminals of the microprocessor 33 via the transceiver 32. Then, the microprocessor 33 calculates the 2's complement of the set division number, i.e., 1111 1100$_2$, and then transmits the calculated 2's complement to the terminals Q0 to Q7 of the comparator 81 via the latch 34. When the binary value of terminals Q0 to Q7 of the comparator 81 is the same as the binary value output from the counters 71 and 72, the comparator 81 transmits a low level pulse to the terminal CTD of the counter 90 per 3 quadrupled pulses through the terminal P=Q thereof.

On the other hand, each pulse signal output from the terminals of the comparators 81 and 82 is transmitted to each terminal LD of the counter 71 and 72 after being delayed through the NAND gates 19 and 20 and the Schmitt-trigger invertors 21 and 22. Every time the pulse signal from the output terminal of the Schmitt-trigger Invertor 22 is transmitted to each terminal LD of the counters 71 and 72, the counters 71 and 72 are reset, and they then perform a new counting operation.

At this time, the delayed quadrupled pulse signal (g) is transmitted to each terminal $\overline{G}$ of the comparators 81 and 82, thereby disabling the comparators 81 and 82 until the quadruple pulse signal (d) is set at the counters 71 and 72.

The counter 90 counts the pulse signals from the terminals CTU and CTD thereof, and then transmits the divided pulse signals through the terminals QA and QB thereof. The pulse signal output from the terminal QB of the counter 90 is shown in FIG. 3 (m). On the other hand, both the pulse signals output from the terminals QA and QB of the counter 90 are input to the exclusive OR gate 27, and then converted into the pulse signal (n) shown in FIG. 3.

Thus divided encoder pulses are again transmitted to the microprocessor 33 and are subsequently used in controlling the rotation speed and direction of the motor 10.

However, when the logic levels of the signals output from the terminals QA and QB of the counter 90 are simultaneously inverted, undesirable noise pulses may occur. To remove the unwanted noise pulses, the divided encoder pulses (m) and (n) are transmitted via the respective D flip-flops 61 and 62.

As described in detail above, the apparatus can be operated in the event that a user directly selects the division number through the switch board. However, it is possible to automatically raise or lower the division number when the number of the counted clock pluses, which occur between the successive rising or falling edge of the encoder pulse signals, is less or greater than the reference number of the clock pulses.

We claim:

1. A rotation speed detecting apparatus for a motor comprising:

encoder means attached to said motor, for producing at least two encoder pulse signals out of phase with one another;

means for detecting the speed of said motor, and calculating and producing a division control signal based on the magnitude of said detected speed;

means for producing an up/down pulse signal according to forward and reverse rotation directions of said motor and a quadrupled pulse signal according to state transitions in said at least two encoder pulse signals; and, means for counting up or down said quadrupled pulse signal and dividing said quadrupled pulse signal by said division control signal.

2. The apparatus according to claim 1, wherein said control and setting means comprises:

a switch board for externally selecting said division number;

a microprocessor for producing said division control signal corresponding to said set division number;

a transceiver for receiving or transmitting said set division number from or to said microprocessor; and, a latch for temporarily storing said division control signal from said microprocessor.

3. The apparatus according to claim 1, wherein said frequency dividing means comprises:

at least two counters connected to each other, for counting up or down said quadrupled pulse signal;

at least two comparators for comparing said quadrupled pulse signal with said division control signal output from said control and setting means; and, a counter for producing divided encoder pulse signals according to the pulse signal output from said comparators.

4. The apparatus according to claim 1, further comprising means for removing noise pulses attendant upon said divided encoder pulse signals output from said frequency dividing means.

5. The apparatus according to claim 2, further comprising means for removing noise pulses attendant upon said divided encoder pulse signals output from said frequency dividing means.

6. The apparatus according to claim 3, further comprising means for removing noise pulses attendant upon said divided encoder pulse signals output from said frequency dividing means.

7. The apparatus according to claim 1, wherein said at least two encoder pulse signals are 90° with one another.

8. The apparatus according to claim 1, wherein said detection of the speed of the motor is performed by counting the number of clock pulses generated for each time interval between rising edges of said divided pulse signal.

9. The apparatus according to claim 1, wherein said detection of the speed of the motor is performed by counting the number of clock pulses generated for each time interval between falling edges of said divided pulse signal.

10. The apparatus according to claim 1, said apparatus further comprising a switch board for forcibly producing a division control signal.

11. A rotation speed detecting apparatus for a motor comprising:

encoder means attached to said motor, for producing at least two encoder pulse signals out of phase from one another;

means for detecting the speed of said motor, calculating and producing a division control signal based on the magnitude of the detected speed;

means for producing a quadrupled pulse signal according to state transitions in said at least two encoder pulse signals; and, means for counting up or down said quadrupled pulse signal and dividing said quadrupled pulse signal by said division control signal.

12. The apparatus according to claim 11, wherein said means for producing comprises means for producing an up/down pulse signal having different logic levels dependent upon the rotation direction of said motor.

13. The apparatus according to claim 11, wherein said control and setting means comprises:
 a switch board for externally selecting said division number;
 a microprocessor for producing said division control signal corresponding to said set division number;
 a transceiver for receiving or transmitting said set division number from or to said microprocessor; and,
 a latch for temporarily storing said division control signal from said microprocessor.

14. The apparatus according to claim 12, wherein said frequency dividing means comprises:
 at least two counters connected to each other, for counting up or down said quadrupled pulse signal;
 at least two comparators for comparing said quadrupled pulse signal with said division control signal output from said control and setting means; and,
 a counter for producing divided encoder pulse signals according to the pulse signal output from said comparators.

15. The apparatus according to claim 12, said apparatus further comprising means for removing noise pulses attendant upon said divided encoder pulse signals output from said frequency dividing means.

16. The apparatus according to claim 11, wherein said detection of the speed of the motor is performed by counting the number of clock pulses generated for each time interval between rising edges of said divided pulse signal.

17. The apparatus according to claim 11, wherein said detection of the speed of the motor is performed by counting the number of clock pulses generated for each time interval between falling edges of said divided pulse signal.

18. The apparatus according to claim 11, said apparatus further comprising a switch board for forcibly producing a division control signal.

* * * * *